A. J. Dexter,

Blacksmiths Tongs.

No. 105,555. Patented July 19, 1870.

Witnesses:
A. W. Almquist
Geo. W. Mabee

Inventor:
A. J. Dexter
per Munn & Co.
Attorneys.

United States Patent Office.

ANDREW J. DEXTER, OF NORTH FOSTER, RHODE ISLAND.

Letters Patent No. 105,555, dated July 19, 1870.

IMPROVED BLACKSMITHS' TONGS.

The Schedule referred to in these Letters Patent and making part of the same.

*To all whom it may concern:*

Be it known that I, ANDREW J. DEXTER, of North Foster, in the county of Providence and State of Rhode Island, have invented a new and useful Improvement in Blacksmiths' Tongs, &c.; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object to improve the construction of blacksmiths' tongs, nippers, and other similar tools, in such a way as to enable them to be so adjusted that they may hold articles of different thicknesses firmly and squarely, the jaws both resting, throughout their whole length, upon the opposite sides of the said articles; and It consists in the construction and combination of the arm and adjusting-screw with the two parts of the tongs, as hereinafter more fully described.

Figure 1:
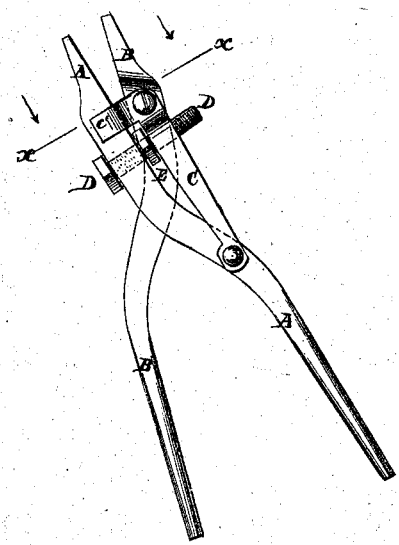
Figure 1 is a side view of a blacksmith's tongs illustrating my improvements.
Figure 2:
Figure 2 is a detail cross-section of the same, taken through the line $x\ x$, fig. 1.

A and B are the two parts of the tongs, which are constructed in about the ordinary form and manner, as shown in fig. 1, except that they are not pivoted to each other.

C is a bar, the rear end of which is pivoted to one of the parts of the tool, as A, by a screw, and the other or forward end of which is pivoted to the forward part of the other part, as B, at or near the base of its jaw, as shown in fig. 1.

D is a screw, which passes through a hole in the one part, as A, and screws into a screw-hole in the bar C, so that, by turning the said screw D, the two parts A B may be adjusted further apart or closer together, according as the article to be held may be thicker or thinner.

Upon the screw D, between the parts A B, and close up to the part A, is placed a small nut E, which holds the said part close up to the head of the said screw, and thus swivels it to the screw.

$c'$ is an arm formed upon the forward end of the bar C, and which projects upward along the side of the part A, at the base of its jaw, to serve as a stop to prevent the article being held by the tool from coming in contact with the screw D.

If desired, the stop $c'$ may be made entirely separate from the bar C.

Having thus described my invention,

I claim as new and desire to secure by Letters Patent—

The combination of the bar C and adjusting-screw D with the parts A B of the tool, substantially as herein shown and described, and for the purpose set forth.

The above specification of my invention signed by me this 11th day of May, 1870.

ANDREW J. DEXTER.

Witnesses:
 GEO. W. MABEE,
 JAMES T. GRAHAM.